United States Patent [19]

Fletcher

[11] Patent Number: 4,643,831

[45] Date of Patent: Feb. 17, 1987

[54] WATER PURIFICATION METHOD AND APPARATUS

[75] Inventor: Brian Fletcher, London, Canada

[73] Assignee: EWS Water Treatment Inc., London, Canada

[21] Appl. No.: 812,304

[22] Filed: Dec. 23, 1985

[51] Int. Cl.$^4$ .............................................. C02F 9/00
[52] U.S. Cl. ................................... 210/668; 210/669; 210/755; 210/807; 210/202; 210/206; 210/253; 210/275; 210/284
[58] Field of Search ................................ 210/754–756, 210/778, 807, 202, 203, 206, 253, 259, 275, 283, 284, 290, 503, 504, 506, 668, 669, 694, 260

[56] References Cited

U.S. PATENT DOCUMENTS

| | | | |
|---|---|---|---|
| 2,661,333 | 12/1953 | Schein | 210/756 |
| 3,291,308 | 12/1966 | Headrick et al. | 210/193 |
| 3,327,859 | 6/1967 | Pall | 210/503 |
| 3,575,853 | 4/1971 | Gaughan et al. | 210/667 |
| 3,633,748 | 1/1972 | Hanley | 210/259 |
| 3,732,164 | 5/1973 | Pressley et al. | 210/756 |
| 3,733,266 | 5/1973 | Bishop | 210/668 |
| 4,021,339 | 5/1977 | Foody | 210/807 |
| 4,202,768 | 5/1980 | DeLonge et al. | 210/754 |
| 4,264,451 | 4/1981 | Pope et al. | 210/754 |
| 4,293,425 | 10/1981 | Price | 210/754 |

Primary Examiner—Ivars Cintins
Attorney, Agent, or Firm—Ridout & Maybee

[57] ABSTRACT

A system for water treatment includes the steps of superchlorinating the water to a level sufficient to destroy bacterial content in the water very rapidly, passing the water through a sand filter in which the medium includes beads of magnesium hydroxide and subjecting different portions of the filtered water to differing degrees of filtration by an activated charcoal filter, whereby to remove a sufficient proportion of the chlorine added to the water to reduce the residual chlorine to a level sufficient to maintain the water sterile without substantially influencing the taste of the water. Preferably, the sand and charcoal filters are disposed horizontally, and the depths of the filter beds are graded horizontally to provide the differing degrees of filtration to the water.

12 Claims, 2 Drawing Figures

WATER PURIFICATION METHOD AND APPARATUS

This invention relates to water purification methods and apparatus for domestic and other relatively small scale users.

There is a requirement for apparatus which can process water which may be relatively heavily contaminated with bacteria and suspended matter so as to provide potable drinking water at reasonable rates of flow where municipal drinking water supplies are not available. Conventional equipment for such applications tend to take the form of scaled down versions of large scale water treatment plants using sand filters and chlorinators. The equipment is bulky, heavy, and definitely not conveniently portable.

None of the above units are believed to provide a suitable basis for a compact water treatment apparatus capable of rendering even heavily contaminated water potable, and providing a reasonable throughput relative to its size. The main problem is that effective treatment requires a combination of filtration and chemical treatment by chlorination; satisfactory treatment by chlorination requires sophisticated control of chlorine addition and substantial residence times which are incompatible with a simple and compact apparatus. Similarly, adequate filtration using conventional vertical sand filters requires apparatus that is bulky and massive, as well as involving the use of pressure vessels.

The object of the present invention is to provide a water treatment method and apparatus capable of providing potable water from even heavily contaminated sources at a rate which is high relative to the bulk of the apparatus.

According to the invention, a method of water treatment comprises superchlorinating the water to a level sufficient to destroy bacterial content in the water very rapidly, passing the water through a sand filter in which the medium includes beads of magnesium hydroxide and subjecting different portions of the filtered water to differing degrees of filtration by an activated charcoal filter, whereby to remove a sufficient proportion of the chlorine added to the water to reduce the residual chlorine to a level sufficient to maintain the water sterile without substantially influencing the taste of the water. Preferably, the sand and charcoal filters are disposed horizontally, and the depths of the filter beds are graded horizontally to provide the differing degrees of filtration to the water.

Further features of the invention will become apparent from the following description of a preferred embodiment thereof with reference to the accompanying drawings, in which.

Figure 1:
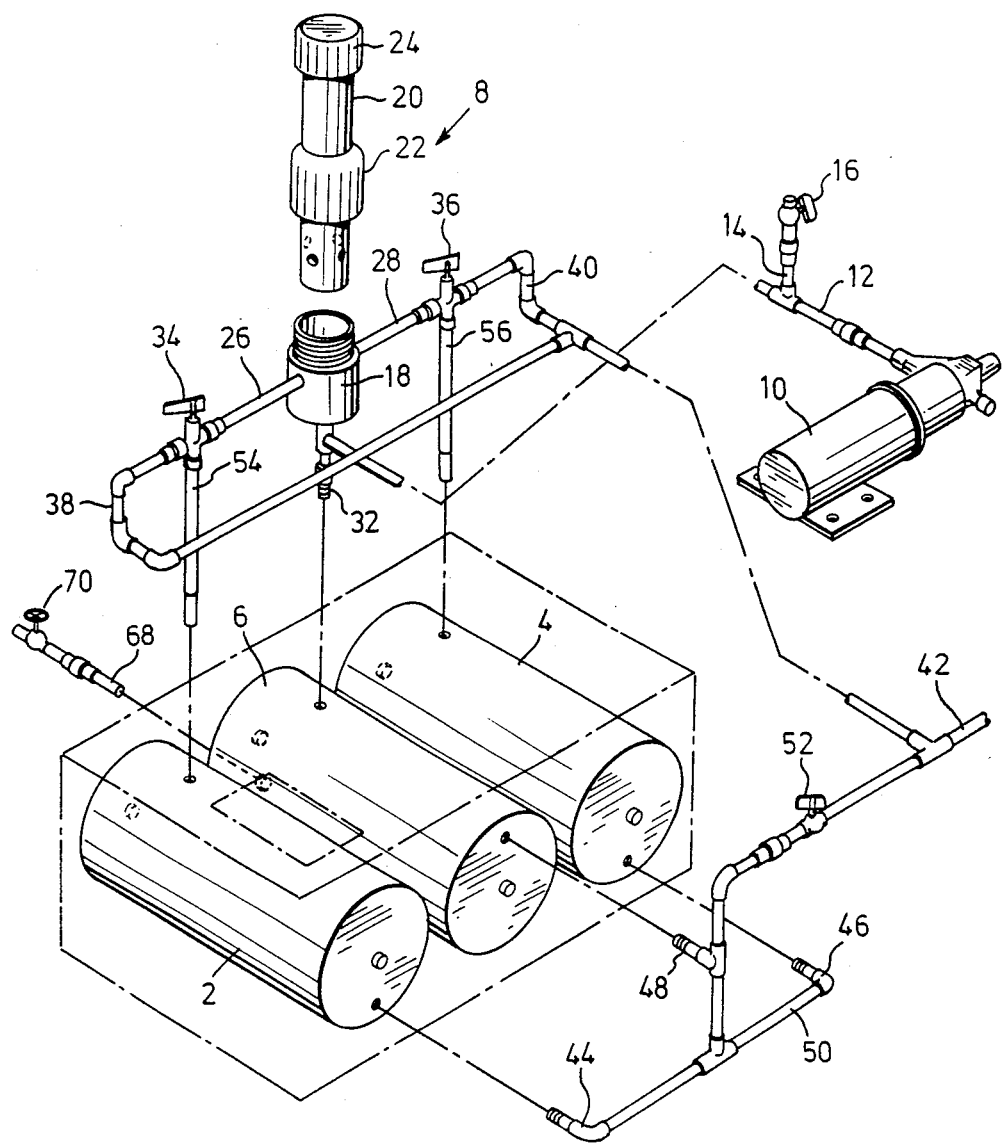
FIG. 1 is an exploded perspective view of a water purification unit.

The apparatus broadly comprises three filter units 2, 4 and 6, a chlorinator 8, connecting pipework and valves described in more detail below, and an input pump 10, assuming that no suitably pressurized source of water is available.

Pressurized water enters the system from the pump 10 or orther source of pressurized water through the pipe 12 to the bottom of the chlorinator 8. A branch pipe 16 is equipped with a valve 16 so that a supply may be taken from the pump bypassing the filter, for uses in which filtration is not required. The chlorinator 8 comprises a vertical cylindrical vessel 18 which receives a vertical tube 20 of somewhat smaller diameter, secured in a fluid tight manner to the vessel 18 by a screw cap 22 and closed at its top and by a further screw cap 24. The vessel 18 has lateral outlets to pipes 26, 28, and at approximately the same level the tube 20 has a ring of small apertures 30. A normally closed valve 32 provides communication between the pipe 12 and the filter unit 6.

The pipes 26, 28 are connected to three way valves 34, 36, as are pipes 38, 40 leading to a common drain line 42. Connections 44, 46, 48 are also made between the filters and a pipe network 50, which is connected to the drain line 42 by a normally closed valve 52. The valves 34, 36 are also connected by pipes 54, 56 to the filters 2 and 4, the valves 34, 36 being operative to connect the pipes 54, 56 to the pipes 26, 28, or the pipes 38, 40, or to neither.

Figure 2:
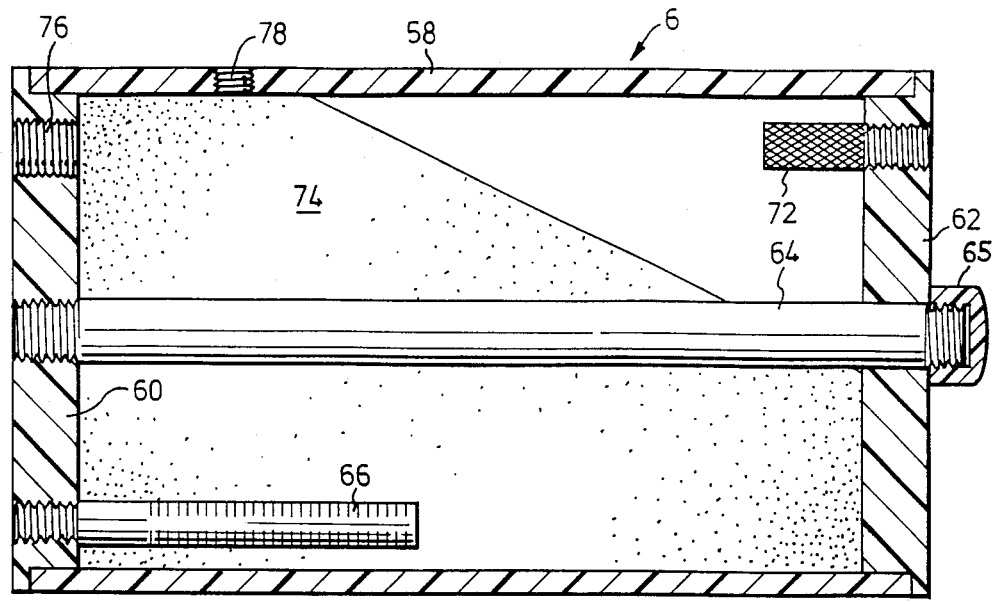
FIG. 2 is a longitudinal vertical section through the central one of the three cylindrical filters units seen in FIG. 1.

Each filter unit (see FIG. 2, showing unit 6) comprises a horizontally extending cylindrical body 58, end plates 60, 62, and a tie rod 64, threaded into the end plate 60, and securing the end plate 62 by means of a threaded end cap 65. Near the lower edge of the end plate 60 is an inwardly axially extending outlet strainer 66 consisting of a multiple slotted tube that is connected to an outlet pipe 68 with a valve 70 through which purified water is drawn from the apparatus. Water enters the filter unit through a mesh inlet strainer 72 extending inwardly from connection 48 (see FIG. 1). Within the unit is a filter medium 74 which in the case of filter unit 6 is granules of activated charcoal. The medium is introduced through a removable plug 76 in one end of the unit, so as to fill about 80% of the interior volume. For example, if the unit has an internal diameter of 15 cm and a length of 30 cm, then the medium should be introduced with the unit stood on end until the level reaches about 7 cm from the opening for plug 76. The unit 6 additionally has a top opening 78, to receive a connection from the valve 32. The filter units 2 and 4 are generally similar, but the inlet and outlet strainers are at opposite ends, with the inlet strainers in the top openings 78, for connection to the pipes 54, 56 and the medium is a mixture of silica and/or other conventional water filtration medium, and magnesium hydroxide granules, typically of 1 to 2 mm diameter. Suitable spherical magnesium hydroxide granules are sold by Steetley under the trade mark MAGNASPHERES. The proportions in which the components are mixed is not particularly critical, but the magnesium hydroxide will be depleted during use of the filter, and an initially approximately equal proportion by volume is believed to provide sufficient sand for efficient filtration together with sufficient magnesium hydroxide to provide extended intervals between replenishments.

In order to set up the unit for use, it is positioned with the longitudinal axes of the filter units horizontal, the pump 10 is connected to a supply of water to be purified, the pipe 42 is arranged to discharge to a suitable drain, and the pipe 68 is connected if necessary to a distribution system for purified water. The filter units 2, 4 and 6 are then backwashed using the procedure described further below. This backwashing operation should take place after transportation of the unit even if the filter media are clean in order to condition them to assume the proper configuration in response to resumption of forward flow through the units, with the free surface of the sand or charcoal, as the case may be, forming a slope facing the inlet to the unit concerned. After backwashing, the water supply is turned off and the valve 32 is closed, the tube 20 is removed by releasing the cap 22, and alum in the amount of a grams is placed in the bottom of vessel 18. The tube 20 is replaced, the cap 24 removed, and tablets of trichloro-s-triazine trione such as are used in swimming pool chlorinators are inserted to fill the tube, which is transparent so that the need for replenishment of the tablets can be monitored visually. After the cap has been replaced, the valves 34 and 36 are reversed to connect the pipes 26 and 28 to the pipes 54 and 56, the valve 70 is opened and the pump 10 operated to force water through the system, the route taken being through the vessel 18 to the inputs of filters 2 and 4, then from the outlets 44 and 46 of filters 2 and 4 through pipe system 50 to the inlet 48 of filter 6, and thence from the outlet of filter 6 to the pipe 68. As the water moves through the system, the alum from vessel 18 is entrained and deposited on the media in filters 2 and 4 where it helps polish the filtered water. A proportion of the water passes up the column 22 past the chlorine tablets and out through the apertures 30, which typically, in the case of filter units of the exemplary dimensions already discussed, will have a diameter of about 3 mm. Assuming a total water flow rate of about 500–700 liters per hour, this will result in the water being superchlorinated to the extent of approximately 15 parts per million of chlorine. In any case, for proper operation of the process the chlorination level should be from about 10 ppm to about 20 ppm, the lower limit being determined by the need for rapid destruction of bacteria and other organic content, and the upper limit by the necessity to limit chlorine consumption and to remove the surplus chlorine late in the process.

The superchlorinated water passes to the filter units 2 and 4 where the flow of the water causes the filter medium to assume a configuration similar to that shown in FIG. 6. The resulting inclined filter bed surface within a cylindrical vessel provides a large surface area whilst the fact that the path between the inlet and outlet extends horizontally as well as vertically thus producing a very compact arrangement. The magnesium hydroxide granules act to buffer the pH of the water, and appear substantially more effective and reproducible in effect in this regard than the partially calcined magnesium carbonate, the use of which has been previously proposed in water treatment plants.

The filtered water from the units 2 and 4 is then passed through the activated charcoal filter unit 6. Although this unit should be effective in removing certain discolourations and residual impurities from the water, its primary purpose is to adjust the chlorine level in the water to suitable levels. Conventional activated charcoal filters are very effective in removing chlorine from water, to the extent that the chlorine level is reduced well beyond that necessary to maintain any residual germicidal effect. This can be hazardous, particularly in filtration units which are used only occasionally, since water may become recontaminated downstream of the unit. In the present instance, the filter is designed to leave a residual chlorine content of about 0.4 to 1.0 ppm, preferably 0.6 to 0.8 ppm. This is achieved by the coaction of the outlet strainer and the inclined surface of the filter medium, since it can thus be assured that the filtering action is graded so that a proportion of the water follows a sufficiently short path through the filter medium to retain a significant residual chlorine content.

The length of the output strainer can be selected to achieve the desired residual chlorine level. A similar effect could be achieved by arranging for a portion of the water to bypass the unit 6, but this has the disadvantages both that some of the water will receive no charcoal filtration and that as the pressure drop across the unit rises between backwashing operations, the proportion of water bypassing the filter will increase.

Since two sand filter units 2 and 4 are provided, the arrangment described enables one filter to be backwashed using water filtered by the other. Simply reversing the position of the appropriate one of the valves 34 and 36 will achieve such backwashes.

The filter 6 maybe backwashed when necessary by closing the valves 34 and 36 and opening the valves 32 and 52. If the magnesium hydroxide granules form about 50% by volume of the filter medium in units 2 and 4, then replenishment about once a year will usually be adequate. The activated charcoal in filter 6 should be replaced at similar intervals.

Although trichloro-s-triazine trione has been exemplified as a chlorinating agent, and is presently believed most suitable, other solid chlorinating agents could be utilized although modification to the chlorinator 8 might be necessary to achieve appropriate chlorine dosage.

I claim:

1. A method of water treatment comprising superchlorinating the water to a level of 10–20 parts per million, passing the water through a sand filter in which the medium includes beads of magnesium hydroxide and subjecting different portions of the filtered water to differing degrees of filtration by an activated charcoal filter, whereby to remove a sufficient proportion of the chlorine added to the water to reduce the residual chlorine to a level sufficient to maintain the water sterile without substantially influencing the taste of the water.

2. A method according to claim 1, wherein the filters are disposed horizontally and the depths of the filter media therein are graded longitudinally to provide differing degrees of filtration to the water and to extend the free surface of the medium.

3. A method according to claim 1, wherein the water is superchlorinated by flowing it past tablets of trichloro-s-trazine trione.

4. A method according to claim 1, wherein the degree of filtration of the water by activated charcoal is such as to reduce its chlorine content to 0.4 to 1 part per million.

5. A method according to claim 1, wherein alum is introduced into the sand filters to polish the water.

6. Apparatus for the purification of water, comprising:
    (a) a source of pressurized water;
    (b) a chlorinator for receiving the pressurized water and adding at least 10 parts per million of chlorine thereto;
    (c) a sand filter for receiving superchlorinated water from the chlorinator, and containing a filter medium comprising a mixture of sand and magnesium hydroxide beads; and
    (d) a further filter for receiving filtered water from the sand filter and for delivering filtered water to an outlet, the filter medium being charcoal, and the path for at least some of the water through the medium being sufficiently short that the water at the outlet retains about 0.4 to about 1.0 parts per million of chlorine.

7. Apparatus according to claim 6, wherein the chlorinator comprises a vessel connected between the water service and the sand filter, and a vertical tube projecting downwardly into the vessel and adapted to contain tablets of a chlorinating agent, the tube being formed with apertures such that a sufficient proportion of the water flows over the tablets to provide a chlorination level of approximately 10 to approximately 20 parts per million.

8. Apparatus according to claim 6, wherein the sand filter medium comprises about 50% by volume of magnesium hydroxide beads.

9. Apparatus according to claim 6, wherein the sand filter comprises two filter units, an inlet of each filter unit being connected by a three way valve to one of the chlorinator and drain line, whereby by connection of both units to the chlorinator the units are in parallel, and by connection of one unit to the drain line, filtered water from the other unit is directed through the one unit to backwash the latter.

10. Apparatus according to claim 9, wherein each unit is a horizontal cylinder closed at each end and about 80% filled with filter medium, having an inlet strainer adjacent the top of one end and an outlet strainer adjacent the bottom of the other end.

11. Apparatus according to claim 10, wherein the length of the outlet strainer is selected such that the path through the medium for at least some of the water is short enough that the medium will leave residual chlorine in the chlorine in that water sufficient to provide about 0.4 to about 1.0 parts per million of chlorine at the output of the filter.

12. Apparatus according to claim 6, wherein the further filter is a horizontal cylinder closed at each end and about 80% filled with filter medium, having an inlet strainer adjacent the top of one end and an outlet strainer adjacent the bottom of the other end, such that flow of water from the inlet to the outlet causes the free surface of medium to assume an inclined configuration.

* * * * *